United States Patent
Kusumi et al.

(10) Patent No.: US 10,721,395 B2
(45) Date of Patent: Jul. 21, 2020

(54) IMAGE PROCESSING APPARATUS, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yuichi Kusumi, Shimotsuke (JP); Chiaki Inoue, Utsunomiya (JP); Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/148,235

(22) Filed: Oct. 1, 2018

(65) Prior Publication Data
US 2019/0109986 A1 Apr. 11, 2019

(30) Foreign Application Priority Data
Oct. 6, 2017 (JP) ................. 2017-195569

(51) Int. Cl.
*H04N 5/232* (2006.01)
*H04N 5/235* (2006.01)
*H04N 5/225* (2006.01)
*H04N 9/04* (2006.01)
*H04N 9/64* (2006.01)

(52) U.S. Cl.
CPC ....... *H04N 5/23229* (2013.01); *H04N 5/2256* (2013.01); *H04N 5/232* (2013.01); *H04N 5/2351* (2013.01); *H04N 5/2354* (2013.01); *H04N 9/045* (2013.01); *H04N 9/64* (2013.01)

(58) Field of Classification Search
CPC .................................. H04N 5/23229
USPC ........................................ 348/370
See application file for complete search history.

(56) References Cited

U.S. PATENT DOCUMENTS

| 8,488,879 B2 | 7/2013 | Kobiki et al. | |
| 2009/0028424 A1* | 1/2009 | Sato | G06T 5/007 382/162 |
| 2012/0274751 A1* | 11/2012 | Smith | G01N 21/87 348/52 |

(Continued)

FOREIGN PATENT DOCUMENTS

| JP | 2003091726 A | 3/2003 |
| JP | 2003216973 A | 7/2003 |
| JP | 2007086720 A | 4/2007 |

(Continued)

OTHER PUBLICATIONS

Higo et al. "Realtime Removal of Specular Reflection Component Based on Dichromatic Reflection Model" Research report computer vision and image media. 2006: 1-8. English abstract provided. Cited in the specification.

*Primary Examiner* — Joel W Fosselman
(74) *Attorney, Agent, or Firm* — Rossi, Kimms & McDowell LLP

(57) ABSTRACT

An image processing apparatus (104) includes a first obtainer (104a) that obtains a plurality of input images (111) obtained by photographing an object a plurality of times while at least one of a light source position and a viewpoint is changed, and a second obtainer (104b) that obtains a plurality of diffuse images (115) based on the same pixel areas of object images in the plurality of input images (111).

17 Claims, 7 Drawing Sheets

(56) References Cited

U.S. PATENT DOCUMENTS

2014/0093158 A1* 4/2014 Watanabe ............... G06T 15/00
382/154

FOREIGN PATENT DOCUMENTS

| JP | 2008016918 A | 1/2008 |
| JP | 2013065215 A | 4/2013 |

* cited by examiner

IMAGE PROCESSING APPARATUS, IMAGE PICKUP APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus.

Description of the Related Art

Japanese Patent Laid-open No. 2013-65215, and Tomoaki Higo, Daisuke Miyazaki, and Katsushi Ikeuchi "Realtime Removal of Specular Reflection Component Based on Dichromatic Reflection Model", Research report computer vision and image media, pp. 211-218, 2006 disclose a method of obtaining a diffuse image from an input image based on pixels extracted for each hue in the input image by using the fact that an object follows a dichroic reflection model. In the dichroic reflection model, reflected light from the object can be represented by the linear sum of a diffuse component which is an object color and a specular component which is a light source color.

In the methods disclosed in Japanese Patent Laid-open No. 2013-65215, and Tomoaki Higo, Daisuke Miyazaki, and Katsushi Ikeuchi "Realtime Removal of Specular Reflection Component Based on Dichromatic Reflection Model", Research report computer vision and image media, pp. 211-218, 2006, in order to estimate the diffuse component for each object having the same diffuse reflectance, pixels are extracted from the input image for each hue in a single input image to estimate the diffuse component. However, when different objects having the same hue exist in the input image, objects having different diffuse reflectance are confusedly processed, and accordingly it is not possible to accurately obtain the diffuse image.

SUMMARY OF THE INVENTION

The present invention provides an image processing apparatus, an image pickup apparatus, an image processing method, and a non-transitory computer-readable storage medium which are capable of correctly obtaining a diffuse image from a plurality of input images.

An image processing apparatus as one aspect of the present invention includes a first obtainer configured to obtain a plurality of input images obtained by photographing an object a plurality of times while at least one of a light source position and a viewpoint is changed, and a second obtainer configured to obtain a plurality of diffuse images based on the same pixel areas of object images in the plurality of input images.

An image pickup apparatus as another aspect of the present invention includes an image sensor configured to photoelectrically convert an object image formed by an image pickup optical system, and the image processing apparatus.

An image processing method as another aspect of the present invention includes the steps of obtaining a plurality of input images obtained by photographing an object a plurality of times while at least one of a light source position and a viewpoint is changed, and obtaining a plurality of diffuse images based on the same pixel areas of object images in the plurality of input images.

A non-transitory computer-readable storage medium storing a program which causes a computer to execute the image processing method.

Further features of the present invention will become apparent from the following description of exemplary embodiments with reference to the attached drawings.

DESCRIPTION OF THE EMBODIMENTS

Figure 1:
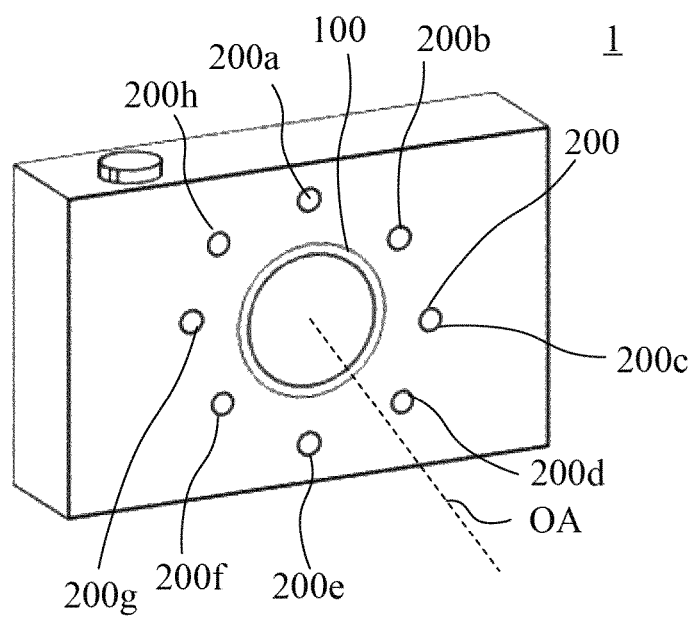
FIG. 1 is an external view of an image pickup apparatus in a first embodiment.

Exemplary embodiments of the present invention will be described below with reference to the accompanied drawings. In each of the drawings, the same elements will be denoted by the same reference numerals and the duplicate descriptions thereof will be omitted.

First Embodiment

Figure 2:
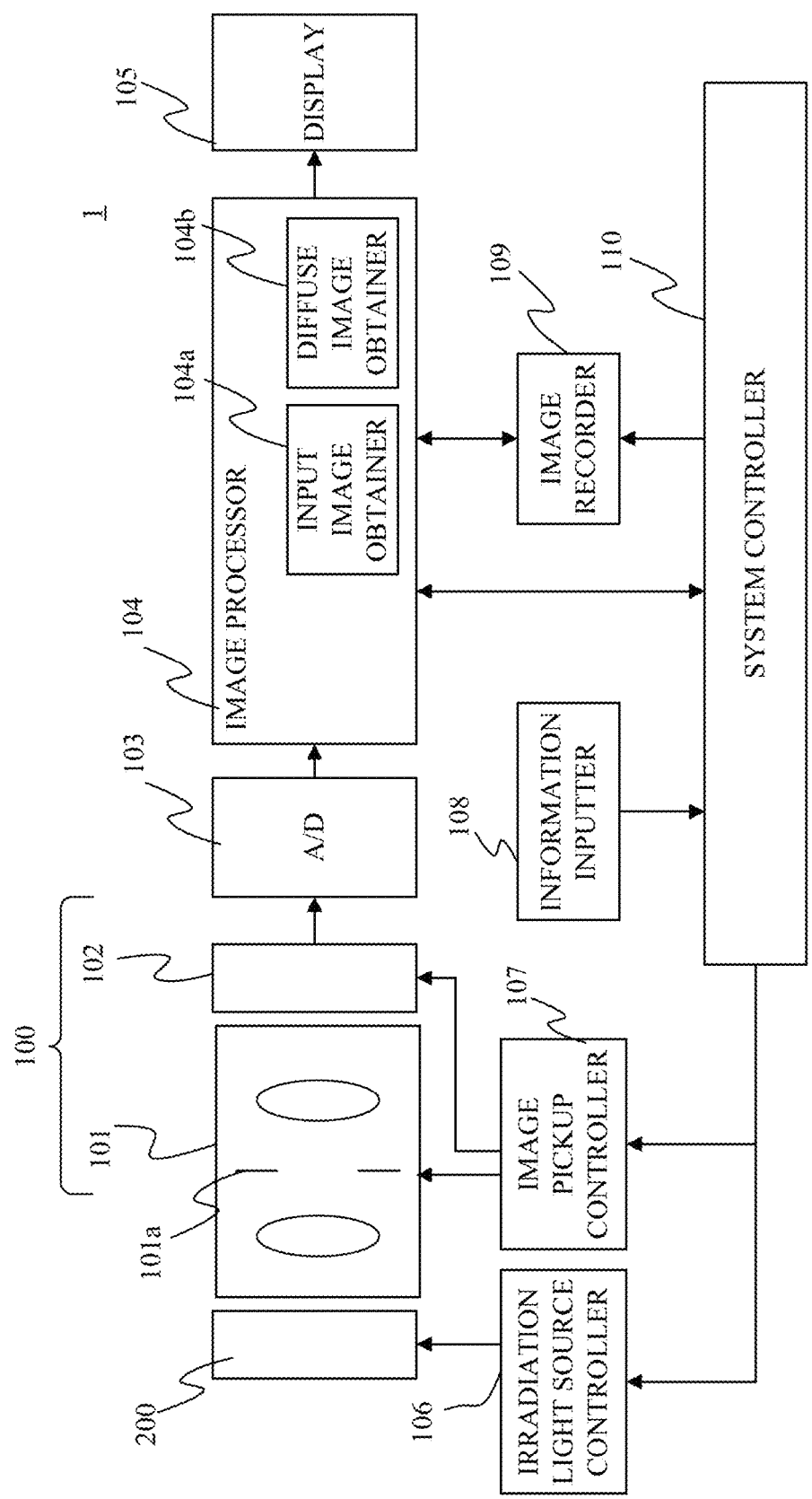
FIG. 2 is a block diagram of the image pickup apparatus in the first embodiment.

First, referring to FIGS. 1 and 2, an image pickup apparatus in a first embodiment of the present invention will be described. FIG. 1 is an external view of an image pickup apparatus 1 in this embodiment. FIG. 2 is a block diagram of the image pickup apparatus 1.

The image pickup apparatus 1 obtains diffuse images (diffuse reflection images) from a plurality of input images. As illustrated in FIG. 1, the image pickup apparatus 1 includes an image pickup unit 100 that captures an image of an object (not illustrated) and a light source unit 200. As illustrated in FIG. 2, the image pickup unit 100 includes an image pickup optical system 101 and an image sensor 102. In this embodiment, the light source unit 200 includes eight light sources 200a to 200h, but the present invention is not limited to this, as long as at least two light sources are provided to obtain the plurality of input images. In this embodiment, the eight light sources are disposed at equal intervals concentrically at positions equidistant from an optical axis OA of the image pickup optical system constituting the image pickup unit 100, but the present invention is not limited to this. In this embodiment, the light source unit 200 is built in the image pickup apparatus 1, but the present invention is not limited to this, and it can be attached externally (that is, it is detachably attached or connectable by wire or wirelessly to the image pickup apparatus 1).

The image pickup optical system 101 includes an aperture stop 101a, and it forms light from the object on the image sensor 102. The image sensor 102 is constituted by a photoelectric conversion element such as a CCD sensor or a CMOS sensor, and it photographs an object (that is, photoelectrically converts an object image (optical image) formed by the image pickup optical system 101 to generate an analog electric signal). An A/D converter 103 converts the analog signal generated by the photoelectric conversion of the image sensor 102 into a digital signal and outputs the digital signal to an image processor 104.

The image processor (image processing apparatus) 104 performs various image processing on the digital signal input from the A/D converter 103. Further, in this embodiment, the image processor 104 obtains diffuse images from a plurality of input images. The image processor 104 includes an input image obtainer (first obtainer) 104a and a diffuse image obtainer (second obtainer) 104b. The input image obtainer 104a obtains the plurality of input images. The diffuse image obtainer 104b obtains the diffuse images from the plurality of input images.

The output image processed by the image processor 104 is stored in an image recorder 109 such as a semiconductor memory or an optical disk. Further, the output image may be displayed on a display (display unit) 105. In this embodiment, the input image obtainer 104a and the diffuse image obtainer 104b are built in the image pickup apparatus 1, but the present invention is not limited to this, and the input image obtainer 104a and the diffuse image obtainer 104b may be provided in an image processing apparatus configured separately from the image pickup apparatus 1 (the image processor 104).

An information inputter 108 supplies an imaging condition (such as an aperture value, an exposure time, a focal length, and the like) selected by a user to a system controller 110. An image pickup controller 107 obtains an image under a desired imaging condition selected by the user based on the information from the system controller 110. An irradiation light source controller 106 controls a light emission state of the light source unit 200 according to a control instruction of the system controller 110. In this embodiment, the image pickup optical system 101 is configured integrally with the image pickup apparatus 1, but the present invention is not limited to this. This embodiment can also be applied to a camera system such as a single-lens reflex camera including an image pickup apparatus body including an image sensor and an image pickup optical system (interchangeable lens) detachably attached to the image pickup apparatus body.

Figure 3:
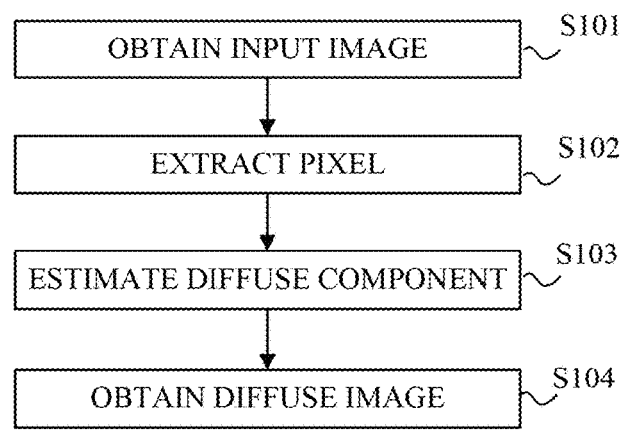
FIG. 3 is a flowchart illustrating an image processing method in the first embodiment.

Next, referring to FIG. 3, an image processing method in this embodiment will be described. FIG. 3 is a flowchart illustrating the image processing method. The image processing method of this embodiment is performed by the system controller 110 and the image processor 104 according to an image processing program as a computer program. The image processing program is stored in, for example, a computer-readable storage medium (such as an internal memory of the system controller 110).

First, at step S101, the input image obtainer 104a obtains, as a plurality of input images, a plurality of captured images captured while a position of the light source illuminating an object is changed by the system controller 110. When the image processor 104 is configured as another image processing apparatus separated from the image pickup apparatus 1, acquisition of the input image can be performed by the image pickup apparatus 1 and the image processing apparatus via wired or wireless communication, and alternatively, it may be performed via a storage medium such as a semiconductor memory or an optical disk.

Figure 4:
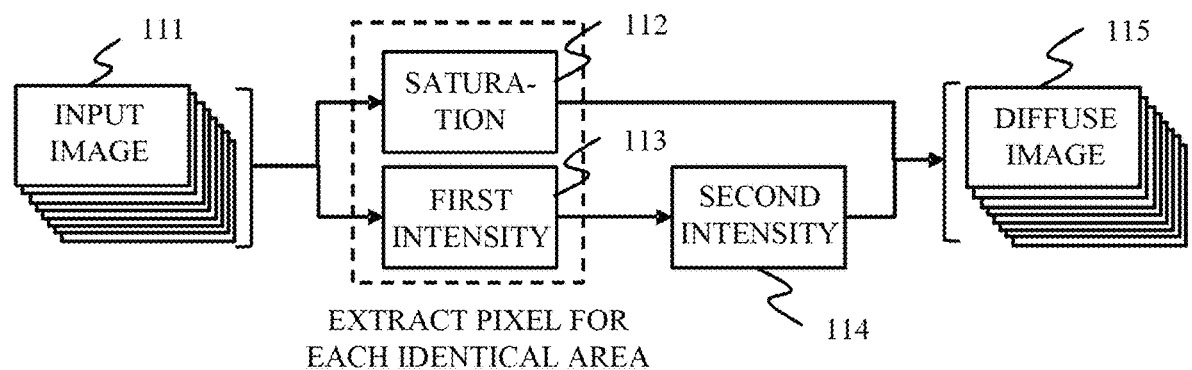
FIG. 4 is an explanatory diagram of the image processing method in the first embodiment.

After step S102, the diffuse image obtainer 104b obtains diffuse images from the plurality of input images obtained at step S101. FIG. 4 is an explanatory diagram of the image processing method of this embodiment (a method of obtaining the diffuse images from the plurality of input images). In this embodiment, when obtaining the diffuse images 115 from the plurality of input images 111, a method of using a dichromatic reflection model is used as disclosed in Japanese Patent Laid-open No. 2013-65215, and Tomoaki Higo, Daisuke Miyazaki, and Katsushi Ikeuchi "Realtime Removal of Specular Reflection Component Based on Dichromatic Reflection Model", Research report computer vision and image media, pp. 211-218, 2006. In these documents, a diffuse image is obtained from an input image based on pixels extracted from the input image for each hue in the input image by using the fact that an object follows the dichroic reflection model. However, when different objects having the same hue exist in the input image, objects having different diffuse reflectance are confusedly processed, and therefore it is not possible to obtain the diffuse image accurately. Accordingly, in this embodiment, the diffuse image obtainer 104b obtains the diffuse images from the plurality of input images based on the pixels (the same pixel areas (corresponding pixel areas) in the object) for each of the same areas (corresponding areas) in the object images (in the object) in the plurality of input images obtained at step S101. Since it extracts the pixels for each of the same areas in the object in the plurality of input images without using the hue, it can perform the processing without confusing the objects having different diffuse reflectance. Here, the same pixel areas in the object images (in the object) means the same pixel areas in an object space. This is because when the viewpoint changes, the position of the object changes in each image, and pixels in the same position may become pixels in different objects in some cases.

At step S102 of FIG. 3, the diffuse image obtainer 104b extracts pixels for each of the same areas (the same pixel areas) in the object in the plurality of input images 111. Here, the area (pixel area) may be either an area including only one pixel or an area including a plurality of pixels. However, it is preferred that only the object having the same diffuse reflectance exist in the area. For example, by using an area division method such as SLIC (SIMPLE LINEAR ITERATIVE CLUSTERING), pixels are extracted from the plurality of input images for each of the same areas in the object obtained by area division of one input image among the plurality of input images.

Figure 5:
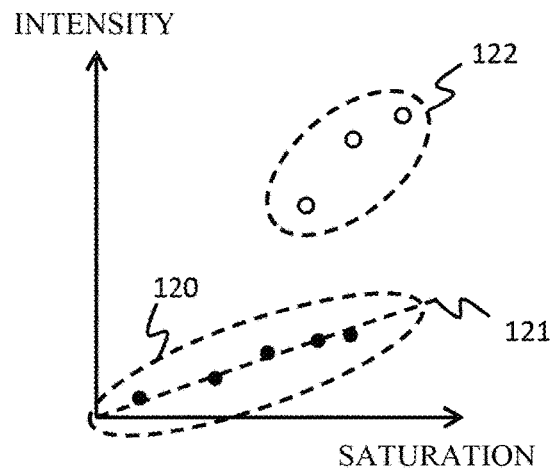
FIG. 5 is a diagram illustrating the relationship between a saturation and a diffuse component and a specular component in the first embodiment.
Figure 6:
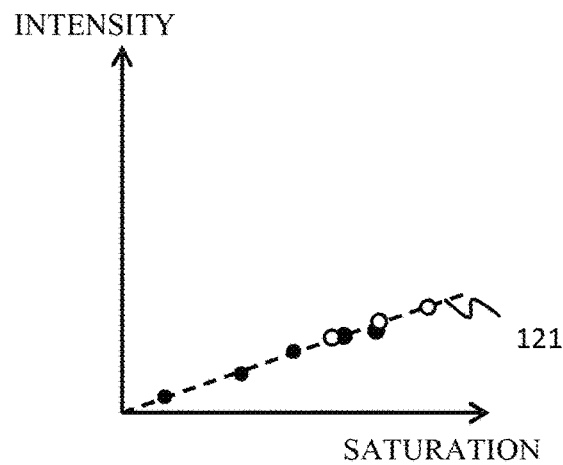
FIG. 6 is an explanatory diagram of estimation of the diffuse component in the first embodiment.

Subsequently, at step S103, the diffuse image obtainer 104b estimates a diffuse component (diffuse reflection component) based on the pixels extracted from the plurality of input images 111 for each of the same areas in the object. Here, referring to FIGS. 5 and 6, a method of estimating the diffuse component will be described. FIG. 5 is a diagram illustrating the relationship between the saturation, the diffuse component and a specular component (specular reflection component). FIG. 6 is an explanatory diagram of the estimation of the diffuse component.

By separating the input image 111 into the diffuse component and the specular component, it is possible to generate various images in image processing after photography. For example, by using the separated diffuse component and the specular component which is a glossy component, it is possible to generate an image with controlled glossiness. In addition, it is possible to obtain a surface normal necessary for generating an image in which the lighting of the object is changed with high accuracy. The appearance of the object is determined by shape information of the object, reflectance information of the object, light source information, and the like. Since the physical behavior of the reflected light which is obtained by reflection of light emitted from the light source by the object depends on a local surface normal, it is particularly effective to use the surface normal of the object instead of a three-dimensional shape as shape information. An illumination difference stereo method is used as a method of obtaining the surface normal of the object. In the illumination difference stereo method, only the diffuse component in the input image is necessary because the surface normal is obtained under the assumption that the object is Lambert diffuse reflection. Accordingly, a technique for estimating the diffuse component from the image is required. If the diffuse component can be estimated from the image, it is possible to simultaneously obtain the specular component by subtracting the diffuse component from the image.

In FIG. 5, the horizontal axis represents the saturation, and the vertical axis represents the intensity of each of the diffuse component and the specular component. As illustrated in FIG. 5, pixels extracted from the plurality of input images for each of the same areas in the object, which is one pixel, are plotted on the saturation and intensity plane calculated using expressions (1) to (3) below. In this case, the diffuse component 120 exists on the straight line 121 passing through the origin. In this embodiment, since there are eight input images photographed while changing the position of the light source, eight pixels are plotted. In expression (1), symbols r, g and b are RGB values in the image for calculating the hue. When the light source is white color, with respect to the component 122 to which specular reflection is added to the diffuse component, only the intensity changes without changing the saturation. Accordingly, it is preferred that white balance correction is performed on the plurality of input images 111 in advance to obtain an image under a white light source. It is also preferred that an image under ambient light is obtained in advance and that an image subtracted from the photographed image is used as the input image.

$$\begin{pmatrix} I_x \\ I_y \\ I_z \end{pmatrix} = \begin{pmatrix} 1 & -\frac{1}{2} & -\frac{1}{2} \\ 0 & \frac{\sqrt{3}}{2} & -\frac{\sqrt{3}}{2} \\ \frac{1}{3} & \frac{1}{3} & \frac{1}{3} \end{pmatrix} \begin{pmatrix} r \\ g \\ b \end{pmatrix} \quad (1)$$

$$\text{saturation} = \sqrt{I_x^2 + I_y^2} \quad (2)$$

$$\text{intensity} = I_z \quad (3)$$

The diffuse image obtainer 104b obtains a saturation 112 and a first intensity 113 in the pixels extracted from the plurality of input images 111 for each of the same areas in the object and estimates an inclination of a straight line 121 where the diffuse component 120 exist. Various fitting methods can be used for estimating the inclination of the straight line 121. When estimating the inclination of the straight line 121, only the diffuse component 120 is required, but a component 122 to which the specular reflection is added is an unnecessary outlier, and accordingly it is preferred that a fitting method that avoids the outlier is used. In order to exclude the specular reflection added component 122, the inclination of the straight line 121 may be estimated from only the pixels of the first intensity 113 which is the minimum in each saturation.

Further, when the number of pixels relating to the component 122 to which the specular reflection is added is larger than that of the diffuse components, there is a possibility that it is difficult to calculate the inclination of the straight line 121 where the diffuse component exists. Accordingly, among the extracted pixels, the minimum value of the value obtained by dividing the intensity by the saturation may be set as the inclination (diffuse component) of the straight line. In this case, it is preferred that pixels whose luminance value is lower than a certain value, such that a reliable luminance value cannot be obtained due to influence of a shadow or the like, are excluded to be processed.

A pixel having the straight line 121 obtained from the estimated inclination, that is, the first intensity 113 larger than a diffuse intensity (diffuse reflection intensity) can be regarded as the component 122 to which specular reflection is added. The diffuse image obtainer 104b replaces the first intensity 113 in such a pixel with a second intensity 114 that is on the straight line 121 as illustrated in FIG. 6. As a result, it is possible to obtain the diffuse component from which the specular component has been removed. Alternatively, the diffuse image obtainer 104b may replace the first intensity 113 of all the extracted pixels with the second intensity 114 which is the diffuse intensity indicated by the straight line 121.

Subsequently, at step S104 of FIG. 3, the diffuse image obtainer 104b obtains diffuse images (diffuse reflection images) 115 based on the second intensity 114 of the obtained diffuse component. The diffuse images 115 can be calculated (obtained) by performing inverse conversion using expressions (1) and (3) described above. As illustrated in FIG. 4, the diffuse image obtainer 104b can obtain all the corresponding diffuse images 115 with respect to the plurality of input images 111. Alternatively, the diffuse image obtainer 104b may obtain the corresponding diffuse images whose number is smaller than that of the input images.

As described above, the diffuse image obtainer 104b can obtain the diffuse images 115 from the plurality of input images 111. Further, in this embodiment, the image processor 104 may further include a gloss controller that obtains an image in which glossiness is controlled using the diffuse image obtained at step S104 and the specular image or the input image 111. Since the glossiness of the image is based on the specular component, by changing a ratio of the specular image to be added to the obtained diffuse image, it is possible to obtain the image with controlled glossiness. The ratio of the specular image to be added may be a preset ratio or may be arbitrarily determined by a user as glossiness. The glossiness of the image can be controlled by using the diffuse image and the specular image, and it may be controlled by changing the ratio of the specular image to be subtracted from the input image. An image obtained by subtracting the diffuse image, obtained at step S104, corresponding to the input image from the input image in which the gloss control is performed may be used as the specular image used for the gloss control.

In this embodiment, while the diffuse images are obtained from the plurality of input images obtained by photographing the object a plurality of times with different light source positions, the diffuse images may be obtained from the plurality of input images obtained by photographing the object a plurality of times with different viewpoints. In the case of extracting the diffuse component from pixels extracted for each of the same areas in the object in the plurality of input images, it is necessary that at least one pixel out of the extracted pixels is a pixel of only the diffuse component not including the specular component. In other words, it is necessary that the pixel position of the specular reflection is different in the plurality of input images and that the extracted pixels includes a pixel only with the diffuse component. Therefore, it is sufficient to obtain the plurality of input images in which one or both of the light source position and the viewpoint are different at the time of photography.

Figure 7:
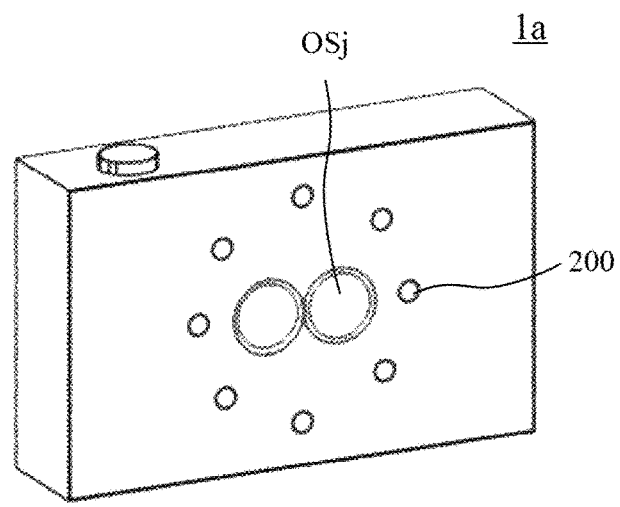
FIG. 7 is an external view of an image pickup apparatus as a modification in the first embodiment.

When obtaining the diffuse images using the plurality of input images captured while changing the viewpoint, it is necessary to extract pixels for each corresponding area in the object in each of the plurality of input images. In the case of using the plurality of input images having different viewpoints, the same object may be imaged using a plurality of image pickup apparatuses, or alternatively, as illustrated in FIG. 7, a plurality of image pickup optical systems OSj (j=1, 2) may be provided in the image pickup apparatus 1a to obtain the plurality of input images. FIG. 7 is an external view of the image pickup apparatus 1a as a modification of this embodiment. An image pickup apparatus including an image pickup system that guides a plurality of light beams passing through different regions (partial regions) in a pupil of the image pickup optical system 101 to different light receiving portions (pixels) in the image sensor 102 to perform photoelectric conversion may be used to obtain the plurality of input images with different viewpoints.

Figure 8:
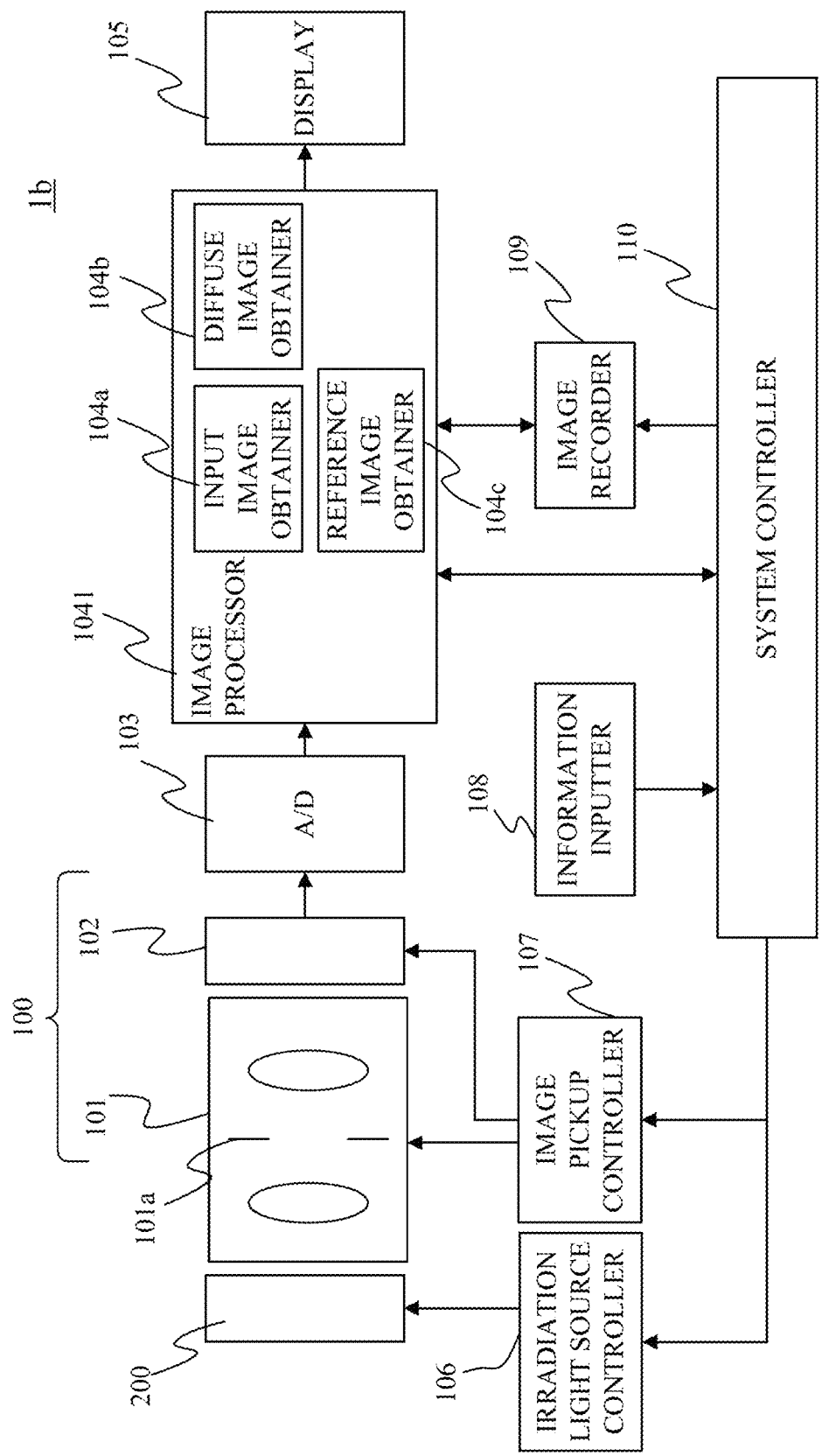
FIG. 8 is a block diagram of the image pickup apparatus as a modification in the first embodiment.

FIG. 8 is a block diagram of an image pickup apparatus 1b as another modification. The image pickup apparatus 1b (image processor 1041) is different from the image pickup apparatus 1 (image processor 104) in that it includes a reference image obtainer 104c that obtains a reference image. Thus, the diffuse image obtainer 104b may obtain the diffuse images using the reference image in addition to the plurality of input images 111.

As described above, in order to obtain the diffuse components, it is necessary that the pixel positions of specular reflection are different in the plurality of input images 111. However, when the difference of the light source positions or the viewpoints is small, a deviation amount of the pixel position of the specular reflection is small, and there is a possibility that a pixel with only the diffuse component does not exist in the extracted pixels. Accordingly, by using the diffuse images estimated from an ambient light image or polarization information as the reference image to estimate the diffuse component together with the plurality of input images, the diffuse images can be obtained even when the difference of the light source positions or the viewpoints is small. In this case, it is preferred that light source colors in the ambient light image and the input image are the same.

When the diffuse image estimated from the polarization information is used as the reference image, it is preferred that polarization information obtained under ambient light or polarization information obtained by irradiating a light source, in addition to obtaining the plurality of input images 111. As a method of obtaining the polarization information, a polarizer may be inserted in front of or behind the image pickup optical system 101 or inside the image pickup optical system 101, so that an image may be captured while a main axis direction of the polarizer is changed. Alternatively, as disclosed in, for example, Japanese Patent Laid-open No. 2007-86720, a patterned polarizer may be disposed in front of the image sensor 102. Further, the polarization information may be obtained by photography using an image pickup apparatus that obtains the polarization information, which is different from the image pickup apparatus 1 (1a, 1b) of this embodiment.

The luminance change that occurs when obtaining the polarization information by rotating the polarizer varies according to the sine function curve. This relationship is represented as expression (4) below by using a luminance I of the reflected light and a main axis angle v of the polarizer.

$$I(v)=A\cdot\cos 2(v-B)+C \quad (4)$$

By determining constants A, B, and C in expression (4), the polarization information can be known. The constants A, B, and C are positive constants, and the constant B can be represented as a value from 0 deg to 180 deg from the periodicity of the cosine function.

When the luminance is measured for three main axis angles of the polarizer, three unknown constants are the constants A, B, and C, and accordingly the constants A, B, and C can be uniquely obtained. On the other hand, when the luminance is measured under four or more polarization conditions, the constants A, B, and C can be obtained by fitting. As a fitting method, a difference between an observation value (vi, Ii) obtained from the i-th condition and a theoretical value represented by expression (4) may be used as an evaluation function, and the fitting can be performed by a known method such as a least-squares method. When the polarization information is obtained by using the image pickup apparatus 1 (1a, 1b), it is preferred that an output signal is corrected so that a luminance value of actual light and the output signal obtained via the image pickup system become linear.

By calculating 2·(C-A) from parameters obtained by the above method, it is possible to obtain the diffuse images which are nonpolarized components. However, the method of obtaining the diffuse image from the polarization information is not limited to this. As described above, according to this embodiment, it is possible to obtain the diffuse images from the plurality of input images.

Second Embodiment

Figure 9:
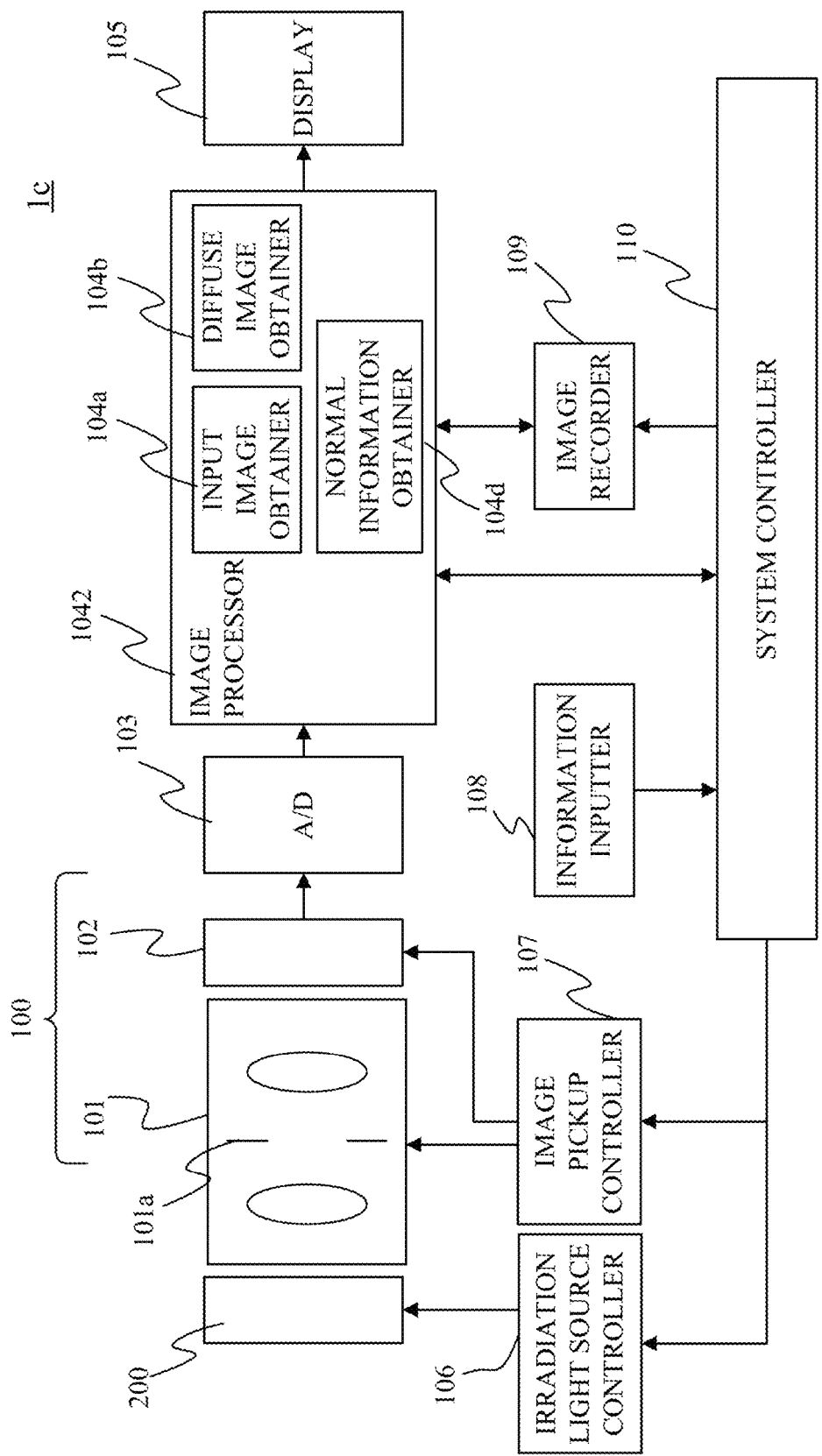
FIG. 9 is a block diagram of an image pickup apparatus in a second embodiment.

Next, referring to FIG. 9, an image pickup apparatus in a second embodiment of the present invention will be described. FIG. 9 is a block diagram of an image pickup apparatus 1c in this embodiment. In this embodiment, an example in which a plurality of diffuse images are obtained from a plurality of input images 111 and then normal information of an object is obtained by illuminance difference stereo will be described.

The image pickup apparatus 1c of this embodiment has the same external appearance as the image pickup apparatus 1 described with reference to FIG. 1. While the light source unit 200 of the image pickup apparatus 1 illustrated in FIG. 1 includes eight light sources 200a to 200h, the image pickup apparatus 1c of this embodiment includes at least three light sources since at least three light sources are necessary to perform the illuminance difference stereo. The light sources 200a to 200h are concentrically arranged at equal distances from the optical axis OA of the image pickup optical system 101 constituting the image pickup unit 100 at equal intervals, but the present invention is not limited to this. While the light source unit 200 is built in the image pickup apparatus 1c, it can be attached externally (that is, it is detachably attached or connectable by wire or wirelessly to the image pickup apparatus 1c).

As illustrated in FIG. 9, the image pickup apparatus 1c (image processor 1042) of this embodiment is different from the image pickup apparatus 1 (image processor 104) in that it includes a normal information obtainer 104d that obtains normal information from a plurality of diffuse images. Other basic configurations are the same as those of the image pickup apparatus 1.

Figure 10:
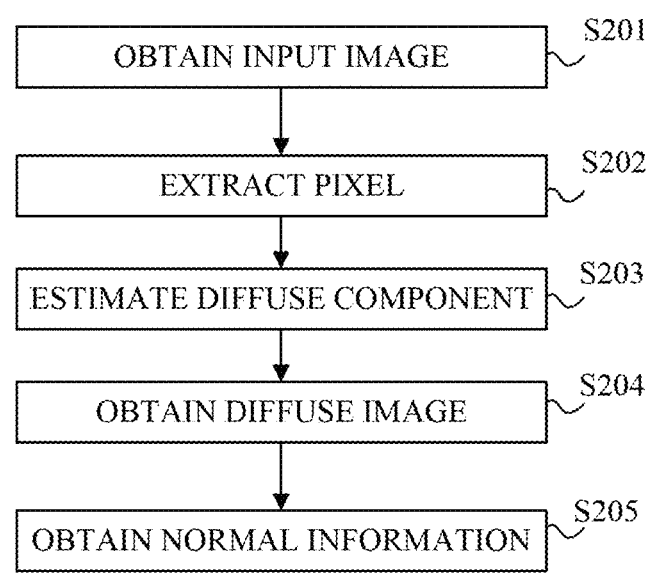
FIG. 10 is a flowchart illustrating an image processing method in the second embodiment.

Next, referring to FIG. 10, an image processing method in this embodiment will be described. FIG. 10 is a flowchart illustrating the image processing method. The image processing method of this embodiment is performed by the system controller 110 and the image processor 1042 according to an image processing program as a computer program. The image processing program is stored in, for example, a computer-readable storage medium (such as an internal memory of the system controller 110).

First, at steps S201 to S204, the image processor 1042 obtains a plurality of diffuse images. Steps S201 to S204 are the same as steps S101 to S104 of FIG. 3 described in the first embodiment, and accordingly detailed descriptions thereof will be omitted. When the normal information of the object is to be obtained by illuminance difference stereo, images captured at three or more different light source positions are necessary. For this reason, in this embodiment, it is necessary to obtain at least three diffuse images.

Subsequently, at step S205, the normal information obtainer 104d obtains the normal information of the object based on the plurality of diffuse images obtained at step S204. The illumination difference stereo method is used for obtaining the normal information. In the illuminance difference stereo method, a reflection characteristic based on a surface normal of the object and a light source direction is assumed, and the surface normal is determined based on luminance information of the object at a plurality of light source positions and the assumed reflection characteristic. The assumed reflection characteristic may be a reflectance that is uniquely determined when a certain surface normal and light source position are given. When the reflection characteristic of the object is unknown, it can be approximated by the Lambertian reflection model according to Lambert's cosine law. In this case, if the specular component (specular reflection component) is included in the luminance information used for the illuminance difference stereo method, it is difficult to accurately calculate the normal of the object. Accordingly, by using the diffuse images, it is possible to calculate the normal with high accuracy. The luminance information used for the illuminance difference stereo method may be obtained by capturing images while a known light source is turned on and off to take a difference between these images, so that the diffuse images obtained from the input images where the influences caused by the factor other than the known light source such as ambient light are removed may be used. Hereinafter, a case where the Lambertian reflection model is assumed will be described.

A luminance of the reflected light is denoted by i, a Lambert diffuse reflectance of an object is denoted by pd, an intensity of incident light is denoted by E, a unit vector (light source direction vector) indicating a direction from the object to the light source is denoted by s, a unit surface normal vector of the object is denoted by n. In this case, according to the Lambert's cosine law, expression (5) below is satisfied.

$$i = E\rho_d s \cdot n \quad (5)$$

Here, when luminance values obtained in the M (M≥3) different light source directions $s_1, s_2, \ldots, s_M$ are denoted by $i_1, i_2, \ldots, i_M$, respectively, expression (5) can be represented by expression (6) below.

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (6)$$

In expression (6), the left side is a luminance vector of M rows and 1 column, $[s_1^T, \ldots S_M^T]$ on the right side is an incident light matrix S indicating the light source direction of M rows and 3 columns, and symbol n is the unit surface normal vector of 3 rows and 1 column. In the case of M=3, by multiplying the inverse matrix of the incident light matrix S from the left, $E\rho_d n$ can be obtained by expression (7) below.

$$E\rho_d n = S^{-1} \begin{bmatrix} i_1 \\ \vdots \\ i_M \end{bmatrix} \quad (7)$$

The norm of the vector on the left side of expression (7) is a product of E and $\rho_d$, and a normalized vector is obtained as the surface normal vector of the object. As can be seen, symbols E and ρd only appear in expression (7) in the product form. Therefore, when $E\rho_d$ is regarded as one variable, it can be regarded as a simultaneous equation that determines three unknown variables together with two degrees of freedom of the unit surface normal vector. Accordingly, by obtaining the luminance information under the three light source conditions, three equations can be obtained to determine the solution. When the incident light matrix S is not regular, there is no inverse matrix, and therefore it is necessary to select the light source directions $s_1$ to $s_3$ so that the incident light matrix S is regular. That is, it is preferred that the light source direction $s_3$ is selected linearly and independently for each of the light source directions $s_1$ and $s_2$.

On the other hand, in the case of M>3, conditional expressions whose number is larger than that of unknown variables are obtained. In this case, it is not possible to obtain the surface normal vector from the three arbitrarily selected conditional expressions by the same method as described above. When four or more conditional expressions are used, the incident light matrix S is not a square matrix, and therefore an approximate solution may be obtained using a Moore-Penrose pseudo inverse matrix, for example. Alternatively, without using matrix calculation, solutions may be obtained by known fitting methods or optimization methods. As described above, according to this embodiment, it is possible to obtain the plurality of diffuse images from the plurality of input images and then obtain the normal information of the object by the illuminance difference stereo method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide an image processing apparatus, an image pickup apparatus, an image processing method, and a non-transitory computer-readable storage medium which are capable of correctly obtaining a diffuse image from a plurality of input images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195569, filed on Oct. 6, 2017, which is hereby incorporated by reference herein in its entirety.

What is claimed is:

1. An image processing apparatus comprising:
a processor that executes a plurality of tasks, the plurality of tasks including:
a first obtaining task configured to obtain a plurality of input images obtained by photographing an object a plurality of times while at least one of a light source position and a viewpoint is changed; and
a second obtaining task configured to obtain a plurality of diffuse images based on the same pixel areas of object images in the plurality of input images,
wherein the second obtaining task is configured to estimate diffuse components based on saturations and intensities of the pixel areas in the plurality of input images by a dichromatic reflection model to obtain the diffuse images.

2. The image processing apparatus according to claim 1, wherein the second obtaining task is configured to determine, as the diffuse components, minimum values of values obtained by dividing the intensities of the pixel areas in the plurality of input images by the saturations.

3. The image processing apparatus according to claim 1, wherein the second obtaining task is configured to obtain the diffuse images for each pixel included in the pixel areas in the plurality of input images without using hues of the plurality of input images.

4. The image processing apparatus according to claim 1, wherein the pixel area is composed of a pixel.

5. The image processing apparatus according to claim 1, wherein the second obtaining task is configured to obtain the plurality of diffuse images whose number is the same as the number of the plurality of input images.

6. The image processing apparatus according to claim 1, wherein the plurality of tasks further comprises a normal information obtaining task configured to obtain normal information of an object based on the plurality of diffuse images.

7. The image processing apparatus according to claim 1, wherein the plurality of tasks further comprises a reference image obtaining task configured to obtain a reference image, wherein the second obtaining task is configured to obtain the diffuse images based on the plurality of input images and the reference image.

8. The image processing apparatus according to claim 7, wherein the reference image is an image photographed under ambient light.

9. The image processing apparatus according to claim 7, wherein the reference image is a diffuse image obtained based on polarization information.

10. An image pickup apparatus comprising:
an image sensor configured to photoelectrically convert an object image formed by an image pickup optical system; and
the image processing apparatus according to claim 1.

11. The image pickup apparatus according to claim 10, further comprising a light source unit including a plurality of light sources.

12. The image pickup apparatus according to claim 10, wherein the first obtaining task is configured to obtain, as the plurality of input images, a plurality of viewpoint images output from the image sensor.

13. An image processing method comprising the steps of:
obtaining a plurality of input images obtained by photographing an object a plurality of times while at least one of a light source position and a viewpoint is changed; and
obtaining a plurality of diffuse images, estimated based on saturations and intensities of the pixel areas in the plurality of input images by a dichromatic reflection model to obtain the diffuse images, based on the same pixel areas of object images in the plurality of input images.

14. A non-transitory computer-readable storage medium storing a program which causes a computer to execute the image processing method according to claim 13.

15. An image processing apparatus comprising:
a processor that executes a plurality of tasks, the plurality of tasks including:
a first obtaining task configured to obtain a plurality of input images obtained by photographing an object a plurality of times while at least one of a light source position and a viewpoint is changed;
a second obtaining task configured to obtain a plurality of diffuse images based on the same pixel areas of object images in the plurality of input images; and
a reference image obtaining task configured to obtain a reference image,
wherein the second obtaining task is configured to estimate diffuse components based on the plurality of input images and the reference image by a dichromatic reflection model to obtain the diffuse images.

16. The image processing apparatus according to claim 15, wherein the reference image is an image photographed under ambient light.

17. The image processing apparatus according to claim 15, wherein the reference image is a diffuse image obtained based on polarization information.

* * * * *